(12) United States Patent
Zheng et al.

(10) Patent No.: US 11,634,334 B2
(45) Date of Patent: Apr. 25, 2023

(54) METHOD OF SYNTHESIZING AN ALUMINOSILICATE MOLECULAR SIEVE BY A CRYSTAL SEED-ASSISTED METHOD

(71) Applicant: CHINA UNIVERSITY OF PETROLEUM-BEIJING, Beijing (CN)

(72) Inventors: Tao Zheng, Beijing (CN); Haiyan Liu, Beijing (CN); Zhichang Liu, Beijing (CN); Xianghai Meng, Beijing (CN); Rui Zhang, Beijing (CN); Chunming Xu, Beijing (CN)

(73) Assignee: CHINA UNIVERSITY OF PETROLEUM-BEIJING, Beijing (CN)

(*) Notice: Subject to any disclaimer, the term of this patent is extended or adjusted under 35 U.S.C. 154(b) by 254 days.

(21) Appl. No.: 17/037,409

(22) Filed: Sep. 29, 2020

(65) Prior Publication Data
US 2021/0094836 A1    Apr. 1, 2021

(30) Foreign Application Priority Data
Sep. 30, 2019    (CN) .......................... 201910944949.X

(51) Int. Cl.
*C01B 39/44*    (2006.01)
(52) U.S. Cl.
CPC .......... *C01B 39/44* (2013.01); *C01P 2002/72* (2013.01); *C01P 2002/86* (2013.01); *C01P 2004/03* (2013.01)
(58) Field of Classification Search
CPC .................................................... C01B 39/44
See application file for complete search history.

(56) References Cited

U.S. PATENT DOCUMENTS

| 10,822,242 B2 * | 11/2020 | Liu ........................ C01B 39/44 |
| 2015/0238932 A1 | 8/2015 | Chiang |
| 2016/0207787 A1 | 7/2016 | Liu |

FOREIGN PATENT DOCUMENTS

| CN | 102602957 A | 7/2012 |
| CN | 102976354 A | 3/2013 |

(Continued)

OTHER PUBLICATIONS

Machine translation of Meng et al. (CN106542537A), publication date Mar. 29, 2017.*

(Continued)

*Primary Examiner* — Jun Li
(74) *Attorney, Agent, or Firm* — J.C. Patents

(57) ABSTRACT

The present disclosure provides a method of synthesizing an aluminosilicate molecular sieve by a crystal seed-assisted method, a natural aluminosilicate clay mineral treated and activated by an alkali is used as a crystal seed for synthesis of the aluminosilicate molecular sieve, and the target molecular sieve product is synthesized by hydrothermal crystallization, wherein the synthesis process does not require addition of conventional crystal seeds of a molecular sieve or use of any organic template agent, thus the synthesized product does not require a calcination process to remove the template agent. The method of synthesizing an aluminosilicate molecular sieve by a crystal seed-assisted method can meet the requirements of both crystallinity and nucleation time, and greatly reduce costs of synthesizing the aluminosilicate molecular sieve, and reduce the environmental pollution caused by removal of the template agent by calcinating.

6 Claims, 9 Drawing Sheets

(56) References Cited

FOREIGN PATENT DOCUMENTS

| CN | 104276586 A | | 1/2015 | | |
|---|---|---|---|---|---|
| CN | 106542537 A | * | 3/2017 | | |
| CN | 106986355 A | | 7/2017 | | |
| CN | 10891091 | | 11/2018 | | |
| CN | 108793184 A | | 11/2018 | | |
| EP | 1105346 B1 | * | 5/2008 | ......... | B01J 20/0292 |

OTHER PUBLICATIONS

The Notice of Allowance of CN application No. 201910944949X.
NPL1: "A quasi-solid-phase approach to activate natural aluminosilicate minerals for zeolite synthesis", by Yang Jinbiao, Dissertation, China University of Petroleum, Feb. 2017 (Abstract only).
The second OA of the CN application No. 201910944949X.
"Catalytic Properties of a Hierarchical Zeolite Synthesized from a Natural Aluminosilicate Mineral without the Use of a Secondary", <<CHEMCATCHEM>> vol. 5, No. 8, Jun. 20, 2013.
"Efficient synthesis of green zeolite in present of seed crystal", by Langlang Xu, Master's Thesis, East China Normal University, May 2013.
The first Office Action of the priority CN application No. 201910944949. X.
NPL1: "A quasi-solid-phase approach to activate natural aluminosilicate minerals for zeolite synthesis", by Yang Jinbiao, Dissertation, China University of Petroleum, Feb. 2017.
NPL2: "A Quasi-Solid-Phase Approach to Activate Natural Minerals for Zeolite Synthesis", by Yang Jinbiao.

* cited by examiner

METHOD OF SYNTHESIZING AN ALUMINOSILICATE MOLECULAR SIEVE BY A CRYSTAL SEED-ASSISTED METHOD

CROSS-REFERENCE TO RELATED APPLICATION

This application claims priority to Chinese Patent Application No. 201910944949.X, filed on Sep. 30, 2019, which is hereby incorporated by reference in its entirety.

TECHNICAL FIELD

The present disclosure relates to the field of preparation technology of molecular sieve catalysts, and in particular, to a method of synthesizing an aluminosilicate molecular sieve by a crystal seed-assisted method.

BACKGROUND

A molecular sieve, such as Y, ZSM-5, mordenite, ZSM-35, Beta, etc., as a type of solid acid catalyst, is widely used in a petroleum processing and petrochemical process, such as catalytic cracking, hydrocracking, hydrocarbon isomerization, and alkylation. However, at present, the molecular sieves used in industry, especially those with a medium or high silicon-to-aluminum ratio, are mostly synthesized from chemical reagents, such as sodium silicate, sodium aluminate, aluminum sulfate, with the assistance of organic template agents. In a process of synthesis of a molecular sieve, the use of the organic template agent will not only increase the cost of synthesis of the molecular sieve, but more importantly, the organic template agent, which is usually an organic substance containing N, Cl, Br and other elements, needs to be removed by calcinating under high temperature at a later stage, and the calcinating temperature is usually above 500° C. Therefore, the process of removing the template agent is a process with high energy consumption and high pollution in the synthesis of the molecular sieve, and does not conform to the development concept of green synthesis of molecular sieves.

For this reason, the research of reducing or no use of template agents to synthesize molecular sieve materials has also become a focused topic in the production technology of aluminosilicate molecular sieve. However, results of this study show that the use of a template agent or a structure-directing agent plays a key role in ensuring the crystallinity of a molecular sieve, reducing or not using template agent, the molecular sieve synthesized generally has low crystallinity. Especially for molecular sieves with a medium or high silicon-to-aluminum ratio, the low crystallinity cannot meet the requirements of industrial applications. The improved technology that has been studied and reported is a crystal seed-assisted method for synthesis of the molecular sieves, which can achieve the purpose of synthesizing molecular sieve products with excellent performance by adding a certain amount of crystal seeds in the synthesis system, without adding any template agent.

The so-called crystal seed-assisted method is a method that introducing crystal seeds in the process of crystallization of the reactant gel to play a similar role as the organic template agent in structure directing and space filling; at the same time, the addition of crystal seeds also help to promote the generation of crystal nucleuses, shorten the crystallization time, increase the crystallinity, and avoid the generation of miscellaneous phases. For example, the research results of ZSM series and mordenite series molecular sieves with good crystallinity synthesized by a crystal seed-assisted method without using an organic template agent have been reported.

CN101973563B discloses a method of synthesizing ZSM-35 molecular sieve by a crystal seed-assisted method. This patented method is designed to use RUB-37 zeolite, which has a topological structure different from ZSM-35 molecular sieve as the crystal seed, to synthesize the ZSM-35 molecular sieve under a condition without using an organic template agent. However, as a key factor of the method, a molecular sieve still has to be used as the introduced crystal seed. The preparation process of RUB-37 zeolite molecular sieve is complicated and the preparation cost is relatively high, the additive amount of the RUB-37 zeolite molecular sieve is required to be 3-10% of the total mass of the added silicon source, although it solves the problem of not using organic templating agent, obviously not conducive to reduce the synthesis cost of the ZSM-35 molecular sieve.

CN104370295B discloses a method of preparing ZSM-35 molecular sieve by using MCM-22 and/or MCM-49 molecular sieves as crystal seeds. The method is characterized in using MCM-22 and/or MCM-49 as the crystal seed to quickly synthesize the ZSM-35 molecular sieve with pure phase in the absence of an organic template agent and at low temperature. However, the implementation of the method still requires the pre-synthesis of MCM-22 and MCM-49 as crystal seeds, the template agents required to be used in the synthesis process are expensive, such as hexamethyleneimine, piperidine, adamantane, etc., which leads to high cost of the crystal seed preparation; and the method also requires the additive amount of the crystal seed to be 3-10% of the total mass of the added silicon source, so the consumption of the crystal seed is relatively large. Hence, this method actually does not completely avoid the use of organic template agents, and results in relatively high costs of synthesizing the ZSM-35 molecular sieve, which limits the extension of industrial production.

CN103058222B discloses a synthesis method of ZSM-35 molecular sieve. The method first treats ZSM-35 molecular sieves with alkali solution to prepare a structure-directing agent, since after the ZSM-35 molecular sieve is treated with the alkali solution, most of the crystal structure will collapse, forming a large number of highly active secondary structure units. The design idea of the patent is to add a directing agent containing a large number of highly active secondary structural units to the silica-alumina gel, in order to ensure that the ZSM-35 molecular sieve with pure phase is obtained after hydrothermal crystallization. Compared with a technique that directly uses ZSM-35 or other molecular sieves as crystal seeds, the greatest advantage of the method is that the consumption of molecular sieves can be reduced, but the preparation of the directing agent is still based on the ZSM-35 molecular sieve, thus, in fact, the method still uses the ZSM-35 molecular sieve as the crystal seed.

CN1050011A discloses a method of preparing a mordenite molecular sieve by using mordenites as crystal seeds, CN102602958B also discloses a method of synthesizing a mordenite molecular sieve without using an organic template agent, using a dealuminated mordenite molecular sieve as the crystal seed, and crystallizing it at a certain temperature to obtain the mesoporous mordenite molecular sieve. Although these methods do not use organic template agents, the synthesis steps are relatively complicated, especially for the latter, the molecular sieve needs to be dealuminated to prepare the crystal seeds. Both the synthesis process and the use of crystal seeds, still increase the cost of mordenites synthesis.

In summary, the current conventional "crystal seed-assisted" methods for synthesizing the aluminosilicate molecular sieve mostly use the same type of molecular sieve or a specially selected molecular sieve as the crystal seed. However, conventionally, these crystal seeds are also synthesized using organic template agents, and the amount of crystal seeds used in the process of synthesizing molecular sieves is relatively large, which is usually 3.0-10.0 wt % with respect to the total mass of a silicon source calculated in terms of $SiO_2$. Strictly speaking, we could say that the synthetic methods that have been researched or applied at present, even the "crystal seed-assisted" methods claimed to be able to replace organic template agents still cannot completely avoid the use of organic template agents. Considering the amount of crystal seed used, even if the synthesis technology that using crystal seed-assisted method (called the conventional or traditional crystal seed-assisted method in the present disclosure) is adopted, there is still a certain distance to truly reduce the production cost of synthesizing aluminosilicate molecular sieves and realize the green production, which is not conducive to the realization of industrial production.

SUMMARY

The present disclosure provides a method of synthesizing an aluminosilicate molecular sieve by a crystal seed-assisted method, using a natural aluminosilicate clay mineral as a raw material of crystal seed, without the use of an organic template agent, which not only synthesizes the aluminosilicate molecular sieve with pure phase in a simple and easy way, but also has the advantages of low costs and environmental protection.

The present disclosure provides a method of synthesizing an aluminosilicate molecular sieve by a crystal seed-assisted method, comprising:

performing activating treatment of a natural aluminosilicate clay mineral with an alkali source, so as to prepare an activated crystal seed;

mixing an alkali source aqueous solution with an aluminum source until a clear and transparent mixture is obtained, adding a silica sol dropwise into the mixture and stirring constantly, so as to prepare a reactant gel with an element composition controlled to be consistent with a composition of a target molecular sieve product;

adding the activated crystal seed to the reactant gel and mixing to form a reactant precursor;

putting the reactant precursor into a reactor for crystallization, wherein a crystallization temperature is 150-190° C., and a crystallization time is 36-72 h;

filtering a crystallization product, and washing it with deionized water until the pH of the filtrate becomes neutral, then drying, so as to obtain the aluminosilicate molecular sieve.

In order to solve the problems existing in the prior art, the present disclosure provides a more green and simple method of synthesizing an aluminosilicate molecular sieve by a template-free, crystal seed-assisted method, using an activated natural aluminosilicate mineral as a crystal seed, and synthesizing the aluminosilicate molecular sieve with pure phase in the absence of template agents. The raw materials used in the synthesis process are all natural mineral raw materials and conventional inorganic chemical reagents, so the whole preparation process is green and environmentally friendly, and the operation steps are simple and easy to implement.

The present disclosure uses the activated crystal seed instead of a template agent or a crystal seed of molecular sieve in a traditional method to synthesize a pure phase molecular sieve with higher crystallinity and complete skeleton. In an embodiment of the present disclosure, the target molecular sieve product synthesized can include a ZSM series molecular sieve, a mordenite molecular sieve and so on. For example, in an embodiment of the present disclosure, the aluminosilicate molecular sieve includes a ZSM-35 molecular sieve and a mordenite molecular sieve, etc.

In an embodiment of the present disclosure, the additive amount of the activated natural mineral raw material as the crystal seed may be referred to the weight in the conventional or traditional crystal seed-assisted method, under the premise of ensuring that a synthetic product in conformity with the properties of the target molecular sieve can be obtained through the crystallization reaction, the specific amount may vary depending on types of molecular sieves. For example, the aluminosilicate molecular sieve is a ZSM-35, an additive amount of the activated crystal seed is 5.0-8.0% with respect to a total mass of a silicon source calculated in terms of silica in the reactant gel; or the aluminosilicate molecular sieve is a mordenite, the additive amount of the activated crystal seed is not less than 3.0% with respect to the total mass of a silicon source calculated in terms of silica in the reactant gel.

The activated crystal seed obtained by using the natural aluminosilicate clay mineral as raw material for activation is one of the important conditions for implementing the present disclosure. In terms of the mechanism of activation of natural aluminosilicate minerals under the action of the alkali source, the intrinsic changes occurring in the activation process and the subsequent crystallization process can be expressed as follows: after the activating treatment, the original crystal structure of the natural aluminosilicate mineral is completely destroyed, the silicon-aluminum species in the crystalline state with low chemical activity is transformed into oligomeric silicate and aluminate with relatively high chemical reactivity. During the crystallization process, the activated natural mineral does not need to be dissolved first, but the highly active oligomeric aluminum or silicon species (silicon-oxygen tetrahedron and aluminum-oxygen tetrahedron) contained therein is rapidly hydrolyzed and polycondensed to generate a cyclic secondary structural unit, thereby accelerating the induction of the nucleation of the molecular sieve.

In the method according to the present disclosure, the specific method of achieving activation of a natural aluminosilicate clay mineral by the action of an alkali source may employ various well-known means. That is, the natural aluminosilicate mineral and the alkali source are mixed uniformly according to a certain mass ratio, and the activation is carried out using a feasible activation method. The natural mineral treated and activated by alkali itself is a highly active silicon-oxygen tetrahedron monomer or a small amount of dimers. Under crystallization conditions, the oligomeric Si/Al tetrahedron will be rapidly hydrolyzed and polycondensed to generate a large number of highly active cyclic secondary structural units, as crystal seeds into the crystallization system, to accelerate the induction of the nucleation of the aluminosilicate molecular sieve. The effect that can be observed and detected is as follows: both the crystallization time and the crystallinity of the synthesized molecular sieve are at least comparable to the traditional crystal seed-assisted methods and technologies using aluminosilicate molecular sieves or other types of molecular sieves as crystal seeds.

For example, in terms of matching the selection and dosage of alkali source, when the activating treatment is performed to prepare the activated crystal seed, the mass ratio of the natural aluminosilicate mineral raw material to the alkali source is 1:1.0-2.0, preferably 1:1.2-1.5. The specific alkali source can be a common alkali or alkaline substance, for example, sodium hydroxide, potassium hydroxide, or mixed alkali sources.

The natural aluminosilicate mineral raw material used for preparing the activated crystal seed can be at least one selected from kaolin, rectorite, bentonite, illite, montmorillonite, mullite and diatomite. For example, kaolin and rectorite are commonly used.

In the synthetic method according to the present disclosure, the activating treatment includes thermal activation, alkali fusion activation, sub-molten salt (SMS) activation and quasi-solid-phase (QSP) activation, and adaptations and derivations method therefrom that can achieve the activation of the natural aluminosilicate mineral. The specific activating operation can be performed in accordance with conventional methods and methods known in the art for treatment of mineral raw materials.

For example, the commonly used sub-molten salt (SMS) activation includes: the natural aluminosilicate mineral raw material, the alkali source (commonly used sodium hydroxide or potassium hydroxide) and water (generally deionized water) are mixed according to the mass ratio of 1:0.5-3.5:1-15 to form a mixture, the mixture reacts in a reactor at 100-350° C. for 1-6 hours to form an activated dry product, and the activated dry product is subjected to cooling, crushing and sieving, then it can be used as the crystal seed of the sub-molten salt activation. In actual operation, firstly, the alkali source can be prepared into 350-500 g/L alkali solution, added to the natural aluminosilicate mineral raw material, mixed and heated, the mixture can be placed in an open reactor or in an oven, then a dry activated product is obtained after the activation. When this method is applied to the present disclosure, the mass ratio of the natural silicon-aluminum mineral raw material to the alkali source is generally 1:1-2, the reaction is performed at 200-300° C. for 2-5 hours, finally, obtaining a dry product.

For example, the quasi-solid-phase (QSP) activation may include: mixing the natural aluminosilicate mineral raw material and the alkali source evenly, adding water and kneading, then extruding to obtain a wet strip, after drying and cooling, it is subjected to crushing and sieving to obtain the activated product. The mixing mass ratio of the natural aluminosilicate mineral raw material to be activated to the alkali source (sodium hydroxide or potassium hydroxide) is generally 1:1.0-2.0, for example, 1:1.2-1.5, and the amount of water added for the kneading is 5-15% of the solid feeding mass, where a banded extruder or similar devices can be used to knead materials back and forth. The shearing force and extrusion force during the kneading process are equivalent to mechanical activation of natural silicon-aluminum mineral raw material first, and then chemical activation of them is performed under the action of alkali. After kneading, the obtained wet strip is subjected to drying, crushing and sieving, and then becomes the crystal seed of QSP activation. There is no special requirement for the drying process, generally the drying process can be performed at 100-300° C. for 3-12 hours. With respect to the quasi-solid-phase activation, reference can also be made to the kaolin activation method disclosed in CN201810993134.6, the relevant contents of which are also introduced into the present disclosure as supplements, and can be adjusted accordingly when other aluminosilicate mineral raw materials are used.

The activated natural aluminosilicate mineral has a large external surface area, which can provide more nucleation sites, and as an activated crystal seeds are more conducive to promote crystallization synthesis, not only facilitating to obtain pure phase molecular sieves, but also facilitating to shorten the nucleation induction period of the synthesized product.

As described above, in the synthesis method provided by the present disclosure without using a template agent, in a specific embodiment, the amount of activated crystal seed, aluminum source, and silica sol can be determined according to the composition of the target molecular sieve product to be synthesized, and the element composition in the reactant gel can be adjusted, where the specific operation and determination method are not particularly limited, and those skilled in the art can complete on their own technical basis. Taking a ZSM-35 molecular sieve and a mordenite molecular sieve for example, when the aluminosilicate molecular sieve is a ZSM-35 molecular sieve, the molar ratio of each component in the reactant gel is $Na_2O:K_2O:SiO_2:Al_2O_3:H_2O=1.5:2.0-3.0:20-30:1:400-1200$; when the aluminosilicate molecular sieve is a mordenite molecular sieve, the molar ratio of each component in the reactant gel is $Na_2O:SiO_2:Al_2O_3:H_2O=2.5-5.0:15-30:1:500-1000$. Embodiments of the present disclosure also indicate that the synthesized ZSM-35 molecular sieve and mordenite molecular sieve are pure phase molecular sieves with higher crystallinity and backbone integrity; the ZSM-35 molecular sieve has a clustered morphology formed by cross-stacking nano-lamellar crystal. The synthesized molecular sieve also has a hierarchical pore structure and a certain external specific surface area.

The specific operations for preparing the reactant gel and implementing hydrothermal crystallization can be summarized as follows: dissolving a certain amount of the alkali source with deionized water, adding a certain amount of the aluminum source, stirring until a clarified and transparent solution is obtained, then adding the silica sol dropwise into the solution, with constantly stirring (maintaining intensely stirring, 20-60 minutes, generally about 30 minutes), to obtain the reactant gel (determining the element composition according to the target molecular sieve product). After that, adding a certain amount of activated natural aluminosilicate mineral as the crystal seed (the additive amount is percentage added based on the total mass of $SiO_2$ in the reactant gel); continue stirring at room temperature for a certain period of time for aging (usually aging at room temperature for 30-120 min, generally about 30 min to meet the requirements), and transferring the obtained reactant precursor to the reactor to complete the crystallization. After crystallization, the product is filtered and washed with deionized water until the pH of the filtrate becomes neutral, and dried (it can be dried at 100-120° C. for 5-8 hours) to obtain the aluminosilicate molecular sieve.

As described above, the natural aluminosilicate mineral treated and activated by alkali itself is a highly active silicon-oxygen tetrahedron monomer or a small amount of dimers. Under crystallization conditions, the oligomeric Si/Al tetrahedron can be rapidly hydrolyzed and polycondensed to generate a large number of highly active cyclic secondary structural units, providing nucleation sites for crystallization, therefore, in the embodiment of the present disclosure, the crystallization process does not need to dissolve the crystal seed first.

The alkali source used for preparing the activated crystal seed and the reactant gel is sodium hydroxide, potassium hydroxide or mixture thereof; the aluminum source for preparing the reactant gel is an aluminum salt commonly used for preparing a molecular sieve, for example, the aluminum source includes one or more of sodium aluminate, aluminum sulfate, aluminum nitrate, aluminum chloride and aluminum hydroxide, etc.

The crystallization process of the reactant gel can adopt dynamic crystallization or static crystallization, or other conventional hydrothermal crystallization. The operation methods are all conventional techniques. For example, the dynamic crystallization can adopt rotating dynamic crystallization, which can be carried out in a rotating oven with a controlled rotation speed of 30-60 rpm. In a specific implementation of the present disclosure, the aged reactant gel is put into a reactor lined with polytetrafluoroethylene, and is dynamically crystallized in a rotating oven at 150-190° C. for 36-72 hours, the a rotation rate is 30-60 rpm; the aged reactant gel also can be dynamically crystallized at 150-190° C. for 36-72 hours. In a specific embodiment, ZSM-35 molecular sieves and mordenite molecular sieves are synthesized by dynamic crystallization and static crystallization respectively, it is more advantageous to synthesize ZSM-35 or the same series of molecular sieves by dynamic crystallization, and the synthesis of mordenite molecular sieves can adopt dynamic crystallization or static crystallization according to specific conditions.

Similar to the usual preparation process of molecular sieve, post-treatment of a crystallization product is a process of filtering, washing to neutral and then drying the product. The synthesis product after crystallization is subjected to solid-liquid separation firstly through filtration, the solid product is collected, and the washing generally refers to washing with deionized water, generally, the product is washed until neutral or nearly neutral, and then the water in the synthesis product is removed by drying to obtain the aluminosilicate molecular sieve.

Based on the design concept of the present disclosure, the activated natural aluminosilicate mineral raw material is introduced into the crystallization system, replacing the template agent or the crystal seed of molecular sieve in a traditional method, and the pure phase molecular sieve product is synthesized through a relatively simpler operation process, in the attached specific embodiment, especially, the high crystallinity ZSM-35 molecular sieve and the mordenite molecular sieve are obtained. Although the mechanism of crystallization induced by the activated products of these mineral raw materials has not yet been fully explained, the present disclosure proves by specific embodiments that using the activated natural mineral raw materials to modulate the crystallization system, the pure phase aluminosilicate molecular sieve can be obtained without the use of templating agents.

It was also found in the present disclosure that in the synthesis of the mordenite molecular sieve, as long as the additive amount of the above-mentioned activated crystal seed is not less than 3.0 wt % (relative to the total mass of $SiO_2$ in the system), the mordenite phase of the synthesized product can be guaranteed, and there is no need to dealuminate the crystal seed, thus simplifying the synthesis procedures and reducing the cost, in this case, the additive amount of the activated crystal seed can even reach the total amount of the aluminum source required.

As an extension of the idea of the present disclosure, when synthesizing the mordenite molecular sieve, even the above-mentioned activated natural aluminosilicate mineral (also called activated crystal seed) can be used to provide all the required aluminum sources without the need to supplement aluminum sources; it is more convenient to obtain the pure phase mordenite molecular sieve by introducing a silicon source to satisfy the silicon-to-aluminum ratio.

Based on the above research findings, the present disclosure also provides a method of synthesizing an aluminosilicate molecular sieve, where the aluminosilicate molecular sieve is a mordenite molecular sieve, and the synthesizing method comprises:

performing activating treatment of a natural aluminosilicate clay mineral with an alkali source;

mixing an aluminum source with water or an alkali solution to prepare a slurry, adding a silica sol dropwise into the slurry and stirring constantly, so as to prepare a reactant gel with an element composition controlled to be consistent with a composition of a target molecular sieve product; wherein part or all of the aluminum source is derived from the natural aluminosilicate mineral that has been subjected to the activating treatment;

putting the reactant gel into a reactor for crystallization, where a crystallization temperature is 150-190° C., and a crystallization time is 36-72 h;

filtering a crystallization product, and washing to substantially neutral, then drying, so as to obtain the mordenite molecular sieve.

The above method can also be regarded as an extreme solution of the crystal seed method, where the natural aluminosilicate mineral raw material that has been subjected to the activating treatment assumes the role of the crystal seed and part or all of the aluminum source at the same time, thus, in addition to the aluminum source, part or all of it can be derived from activated mineral raw materials. When preparing the slurry, water or alkali solution can be selected to satisfy to the pH of the system according to the needs. All process conditions and raw material selection and treatment can be as described above.

The present disclosure also provides specific examples of synthesizing mordenite molecular sieve according to the above-mentioned solutions, with a system of the quasi-solid-phase activation clay mineral as the entire aluminum sources, the preparation of the reactant gels using an aging process of heating in water bath (50-80° C.) and maintain stirring for a period of time (e.g., 2-6 hours), which facilitates faster nucleation of the molecular sieve. Other identical operational requirements are not repeated.

The method of synthesizing an aluminosilicate molecular sieve by a crystal seed-assisted method provided by the present disclosure may have the following advantages:

(1) It provides a new synthesis method, using activated natural aluminosilicate clay mineral as the crystal seed, no longer using organic template agent when synthesizing a molecular sieve. The synthesized target molecular sieve product has characteristics including crystallinity, skeleton morphology characteristics, and crystallization time comparable to the traditional crystal seeds methods using aluminosilicate molecular sieve or other types of molecular sieves as crystal seeds, thereby providing a new direction for the research of synthesis of aluminosilicate molecular sieve;

(2) the activated natural aluminosilicate clay mineral is used as the crystal seed to synthesize the aluminosilicate molecular sieve, the raw material of crystal seed is cheap and easy to get; and different from a traditional crystal seed, the preparation process of crystal seed does not use any organic template agent or any structure-directing agent, so the entire preparation process is green and environmentally friendly, simple operation, thereby greatly reducing costs of synthesizing an aluminosilicate molecular sieve by a crystal seed-assisted method, and having a very broad prospect for industrial application;

(3) the synthesized molecular sieve product, such as a ZSM-35 and a mordenite, is a pure phase molecular sieve with higher crystallinity and skeleton integrity, and has a clustered morphology formed by cross-stacking nano-lamellar crystal; at the same time, the synthesized molecular sieve product further has a hierarchical pore structure and a certain external specific surface area, which is more conducive to the selection from downstream applications.

DESCRIPTION OF EMBODIMENTS

Figure 1:
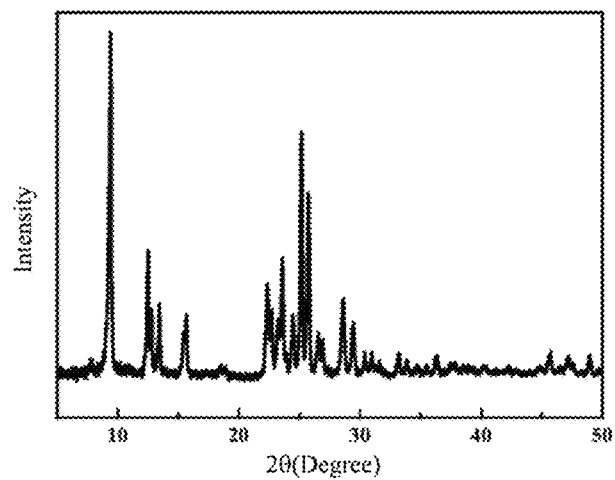
FIG. 1 is a X-ray diffraction (XRD) pattern of a ZSM-35 molecular sieve prepared by Example 1 of the present disclosure.

In order to make the objectives, technical solutions and advantages of the present disclosure more explicit, technical solutions in embodiments of the present disclosure is illustrated clearly and completely in combination with the accompanying drawings and embodiments hereinafter. Obviously, embodiments described are only a part of embodiments of the present disclosure, and are not all of embodiments thereof. Based on the embodiments of the present disclosure, all the other embodiments obtained by those skilled in the art without any creative works are within the protection scope of the present disclosure.

In the following examples and comparative examples:

The XRD pattern is measured by German Bruck AXS D8 Advance X-ray diffractometer;

The SEM image is obtained by German Zeiss ULTRA 55 field emission scanning electron microscope;

The $N_2$ adsorption-desorption isotherm and pore structure parameters of a sample are measured using Quanta Chrome Autosorb iQ high-performance automatic gas adsorption instrument; where the specific surface area of the sample is calculated using BET equation based on the adsorption equilibrium isotherm of the relative pressure between 0.05-0.25; the total pore volume is calculated by converting the adsorption volume to liquid nitrogen volume at a relative pressure of 0.99; the specific surface area and volume of micropores of a sample are calculated through the t-plot model; the mesoporous and micropore pore size distribution of a sample is calculated by the Barrett-Joyner-Halenda (BJH) method.

The present disclosure uses the relative crystallinity to evaluate the crystallization effect of the molecular sieve, that is:

The relative crystallinity of the ZSM-35 molecular sieve mentioned refers to the ratio of the sum of peak areas at 2θ=9.3°, 22.3°, 22.5°, 23.3°, 23.5°, 24.4°, 25.2° and 25.6° in the XRD pattern of the synthesized product and the ZSM-35 molecular sieve sample (Comparative Example 1) synthesized by the traditional crystal seed-assisted method, in percentages. The crystallinity of the ZSM-35 molecular sieve sample (Comparative Example 1) synthesized by the traditional crystal seed-assisted method is defined as 100%.

The relative crystallinity of the mordenite molecular sieve mentioned refers to the ratio of the sum of peak areas at 2θ=6.51°, 9.77°, 13.45°, 22.2°, 25.63°, 26.25° and 27.67° in the XRD pattern of the synthesized product and the mordenite molecular sieve sample (Comparative Example 5) synthesized by the traditional crystal seed-assisted method, in percentages. The crystallinity of the mordenite molecular sieve sample (Comparative Example 5) synthesized by the traditional crystal seed-assisted method is defined as 100%.

Example 1

The quasi-solid-phase activation is used to activate kaolin to prepare a crystal seed, and steps of preparing the crystal seed are as follows: mixing kaolin and sodium hydroxide according to the mass ratio of 1:1.2, adding a certain amount of deionized water (the additive amount of water accounts for 10% of the solid feeding mass) and kneading in a banded extruder for about 10 minutes, then extruding to obtain a wet strip with a diameter of approximately 1.5 mm, and then placing the wet strip in an oven at 150° C. to dry for about 3 hours, and cooling the dried product to room temperature; crushing and sieving to below 300 mesh to prepare the kaolin activated by QSP.

1.42 g of potassium hydroxide is weighed, and dissolved with deionized water, stirring until a clear and transparent solution is obtained; 1.23 g of sodium aluminate ($NaAlO_2$, 80 wt %) is added, stirring until the solution is clear and transparent; afterwards, 24.0 g of a silica sol ($SiO_2$, 30 wt %) is added dropwise into the solution, stirring intensively for about 30 minutes to obtain a reactant gel. The molar ratio of each component (in terms of its oxide) in the reactant gel is $1.5Na_2O:2.0K_2O:20SiO_2:1Al_2O_3:600H_2O$. Adding 5.0 wt % (the mass percentage is calculated based on the total mass of $SiO_2$ in the reactant gel) quasi-solid-phase activated kaolin to the reactant gel as the crystal seed, and continuously stirring for about 30 minutes for aging, then a reactant precursor obtained is transferred into a 100 mL reactor lined with PTFE, and is placed in an oven at 175° C. for 48 h for dynamic crystallization, where the speed of rotation is controlled to be 30-60 rpm during the crystallization process. After crystallization, the obtained synthesized product is filtered and washed with deionized water until the pH of the filtrate becomes neutral, and then dried at 120° C. for 6 h to obtain a synthetic product.

As determined by XRD, the phase of the synthetic product belongs to the ZSM-35 molecular sieve, and the relative crystallinity is 102%, as shown in FIG. 1.

Figure 2:
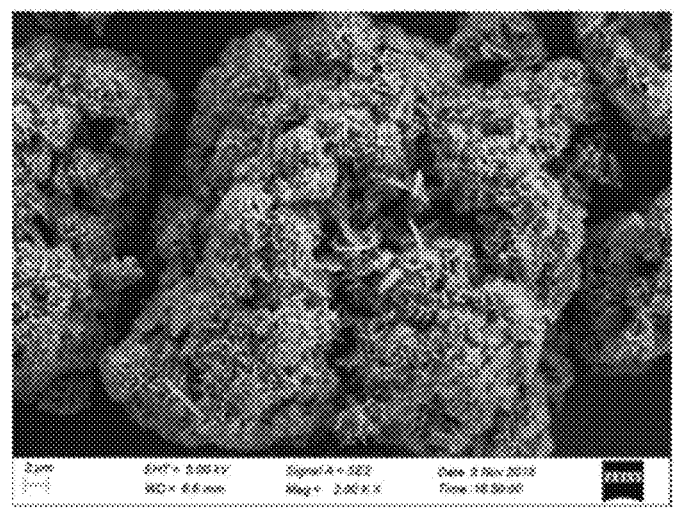
FIG. 2 is a field emission scanning electron microscope (SEM) image, at a magnification of 2000 times, of a ZSM-35 molecular sieve prepared by Example 1 of the present disclosure.

As determined by SEM, the morphology of the synthetic product is irregularly clustered and the clustered aggregation is agglomerated by small spherical aggregates, and these small spherical aggregates are cross-aggregated from lamellae about 1 μm in size, as shown in FIG. 2.

Figure 3:
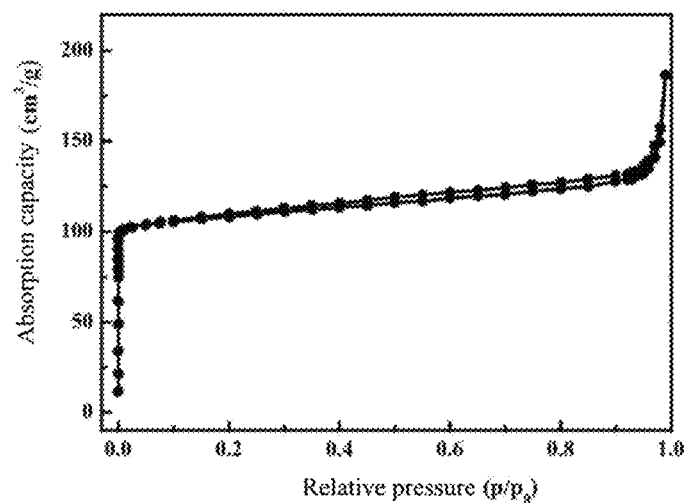
FIG. 3 is a $N_2$ adsorption-desorption isotherm of a ZSM-35 molecular sieve prepared by Example 1 of the present disclosure.

As determined by a gas adsorption instrument, the $N_2$ adsorption-desorption isotherm is of type I, and there is a long and narrow H4-type hysteresis loop, indicating that it contains narrow cracking pores produced by cross-stacking of lamellar monocrystals, as shown in FIG. 3. It can also be seen in FIG. 3 that the adsorption isotherm shows a clear upward warping at a relative pressure close to 1.0, which also indicates that it contains a certain amount of macropores. Therefore, the synthesized product is a ZSM-35 molecular sieve with micro-meso-macroporous pore structure.

Figure 4:
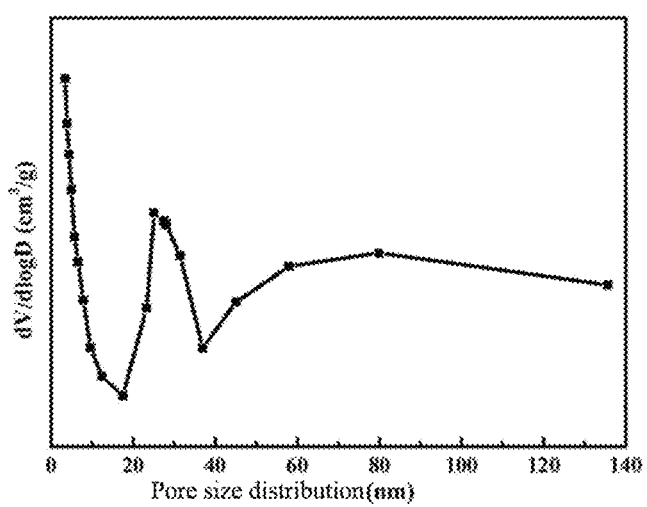
FIG. 4 is a BJH pore size distribution diagram (the ordinate is the pore volume expressed in logarithmic coordinate) of a ZSM-35 molecular sieve prepared by Example 1 of the present disclosure.

The BET specific surface area of the molecular sieve is 342 $m^2/g$, the area of the micropore is 293 $m^2/g$, the area of the mesoporous is 49 $m^2/g$, the pore volume of the micropore is 0.12 $cm^3/g$, the pore volume of the mesoporous is 0.07 $cm^3/g$. It can be seen from the pore size distribution diagram that the synthesized product has a certain amount of mesopores in the range of 20-50 nm and a certain amount of macropores distributed in the range above 50 nm, as shown in FIG. 4.

Figure 5:
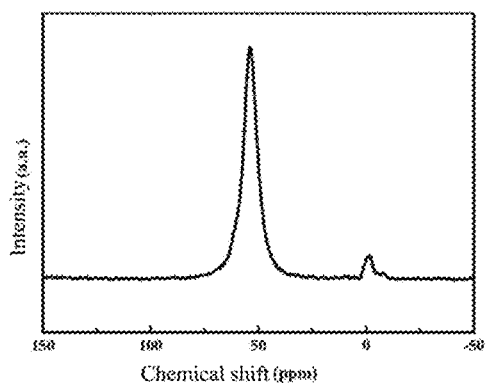
FIG. 5 is an $^{27}Al$ MAS NMR spectrum of a ZSM-35 molecular sieve prepared by Example 1 of the present disclosure.

As determined by $^{27}Al$ MAS NMR, the synthesized product has a nuclear magnetic peak at δ=54 ppm, which belongs to the tetra-coordinated framework aluminum of the molecular sieve, and a faint nuclear magnetic peak at δ=0 ppm, which belongs to non-framework aluminum, indicating that the atomic utilization rate of the system and the skeleton integrity of the product are both high, as shown in FIG. 5. It has been determined that the nucleation induction period is less than 9 h, and the rapid growth period is 9-20 h.

Example 2

The preparation method of the quasi-solid-phase activated kaolin crystal seed is the same as that of Example 1.

1.42 g of potassium hydroxide is weighed, and dissolved with deionized water, stirring until a clear and transparent solution is obtained; 1.23 g of sodium aluminate ($NaAlO_2$, 80 wt %) is added, stirring until the solution is clear and transparent; afterwards, 24.0 g of a silica sol ($SiO_2$, 30 wt %) is added dropwise into the solution, stirring intensively for about 30 minutes to obtain a reactant gel. The molar ratio of each component (in terms of its oxide) in the reactant gel is $1.5Na_2O:2.0K_2O:20SiO_2:1Al_2O_3:600H_2O$. Adding 8.0 wt % (the mass percentage is calculated based on the total mass of $SiO_2$ in the reactant gel) quasi-solid-phase activated kaolin to the reactant gel as the crystal seed, and continuously stirring for about 30 minutes, then a reactant precursor obtained is transferred into a 100 mL reactor lined with PTFE, and is placed in an oven at 190° C. for 36 h for dynamic crystallization, where the speed of rotation is controlled to be 30-60 rpm during the crystallization process. After crystallization, the obtained synthesized product is filtered and washed with deionized water until the pH of the filtrate becomes neutral, and then dried at 120° C. for 6 h to obtain a synthetic product.

Figure 6:
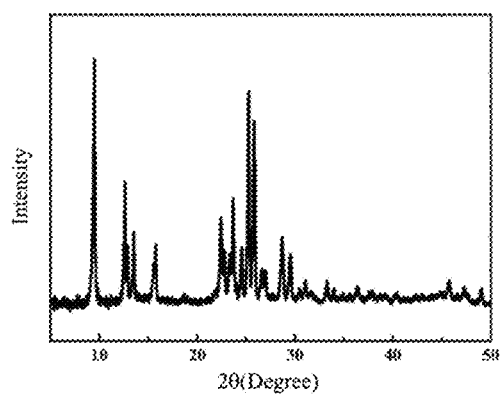
FIG. 6 is an XRD pattern of a ZSM-35 molecular sieve prepared by Example 2 of the present disclosure.

As determined by XRD, the phase of the synthetic product belongs to the ZSM-35 molecular sieve, and the relative crystallinity is 100.5%, as shown in FIG. 6.

Example 3

The sub-molten salt activation method is used to activate kaolin to prepare a crystal seed, and steps of preparing the crystal seed are as follows: mixing kaolin, sodium hydroxide and deionized water according to the mass ratio of 1:1.5:6, then placing the mixture in an oven at 250° C. to dry for 3 hours, and cooling the dried product to room temperature; crushing and sieving to below 300 mesh to prepare the kaolin activated by sub-molten salt activation.

1.89 g of potassium hydroxide is weighed, and dissolved with deionized water, stirring until a clear and transparent solution is obtained; 1.64 g of sodium aluminate ($NaAlO_2$, 80 wt %) is added, stirring until the solution is clear and transparent; afterwards, 32.0 g of a silica sol ($SiO_2$, 30 wt %) is added dropwise into the solution, stirring intensively for about 30 minutes to obtain a reactant precursor. The molar ratio of each component (in terms of its oxide) in the reactant gel is $1.5Na_2O:2.0K_2O:20SiO_2:1Al_2O_3:400H_2O$. Adding 6.0 wt % (the mass percentage is calculated based on the total mass of $SiO_2$ in the reactant gel) sub-molten salt activated kaolin to the reactant gel as the crystal seed, and continuously stirring for about 30 minutes, then a reactant gel obtained is transferred into a 100 mL reactor lined with PTFE, and is placed in an oven at 150° C. for 60 h for dynamic crystallization, where the speed of rotation is controlled to be 30-60 rpm during the crystallization process. After crystallization, the obtained synthesized product is filtered and washed with deionized water until the pH of the filtrate becomes neutral, and then dried at 120° C. for 6 h to obtain a synthetic product.

Figure 7:
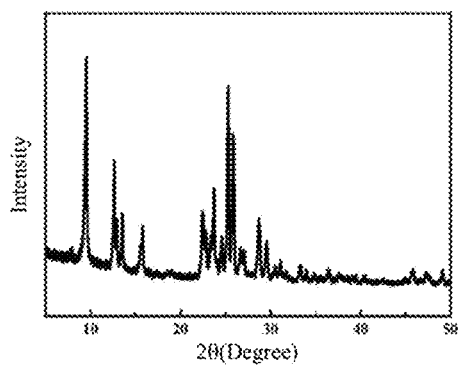
FIG. 7 is an XRD pattern of a ZSM-35 molecular sieve prepared by Example 3 of the present disclosure.

As determined by XRD, the phase of the synthetic product belongs to the ZSM-35 molecular sieve, and the relative crystallinity is 97%, as shown in FIG. 7.

Example 4

The preparation method of the quasi-solid-phase activated rectorite crystal seed is the same as that of Example 1.

1.1 g of potassium hydroxide is weighed, and dissolved with deionized water, stirring until a clear and transparent solution is obtained; 0.62 g of sodium aluminate (NaAlO$_2$, 80 wt %) is added, stirring until the solution is clear and transparent; afterwards, 18.0 g of a silica sol (SiO$_2$, 30 wt %) is added dropwise into the solution, stirring intensively for about 30 minutes to obtain a reactant gel. The molar ratio of each component (in terms of its oxide) in the reactant gel is 1.5Na$_2$O:3.0K$_2$O:30SiO$_2$:1Al$_2$O$_3$:1200H$_2$O. Adding 5.0 wt % (the mass percentage is calculated based on the total mass of SiO$_2$ in the reactant gel) quasi-solid-phase activated rectorite to the reactant gel as the crystal seed, and continuously stirring for about 30 minutes, then a reactant precursor obtained is transferred into a 100 mL reactor lined with PTFE, and is placed in an oven at 175° C. for 48 h for dynamic crystallization, where the speed of rotation is controlled to be 30-60 rpm during the crystallization process. After crystallization, the obtained synthesized product is filtered and washed with deionized water until the pH of the filtrate becomes neutral, and then dried at 120° C. for 6 h to obtain a synthetic product.

Figure 8:
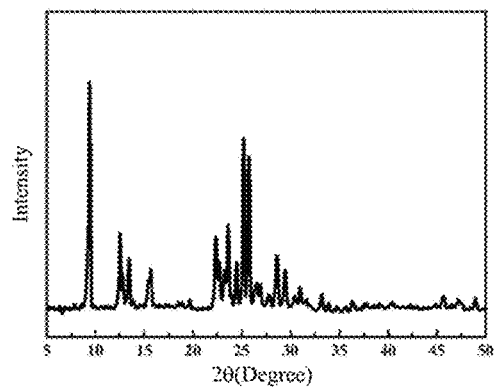
FIG. 8 is an XRD pattern of a ZSM-35 molecular sieve prepared by Example 4 of the present disclosure.

As determined by XRD, the phase of the synthetic product belongs to the ZSM-35 molecular sieve, and the relative crystallinity is 99%, as shown in FIG. 8.

Example 5

The alkali fusion activation method is used to activate kaolin to prepare a crystal seed, and steps of preparing the crystal seed are as follows: mixing kaolin and sodium hydroxide according to the mass ratio of 1:1.35, then placing the mixture in a muffle furnace at 600° C. to dry for 4 hours, and cooling the calcined product to room temperature; crushing and sieving to below 300 mesh to prepare the kaolin activated by alkali fusion activation.

1.42 g of potassium hydroxide is weighed, and dissolved with deionized water, stirring until a clear and transparent solution is obtained; 1.23 g of sodium aluminate (NaAlO$_2$, 80 wt %) is added, stirring until the solution is clear and transparent; afterwards, 24.0 g of a silica sol (SiO$_2$, 30 wt %) is added dropwise into the solution, stirring intensively for about 30 minutes to obtain a reactant gel. The molar ratio of each component (in terms of its oxide) in the reactant gel is 1.5Na$_2$O:2.0K$_2$O:20SiO$_2$:1Al$_2$O$_3$:600H$_2$O. Adding 5.0 wt % (the mass percentage is calculated based on the total mass of SiO$_2$ in the reactant gel) alkali fusion activated kaolin to the reactant gel as the crystal seed, and continuously stirring for about 30 minutes, then a reactant precursor obtained is transferred into a 100 mL reactor lined with PTFE, and is placed in an oven at 175° C. for 48 h for dynamic crystallization, where the speed of rotation is controlled to be 30-60 rpm during the crystallization process. After crystallization, the obtained synthesized product is filtered and washed with deionized water until the pH of the filtrate becomes neutral, and then dried at 120° C. for 6 h to obtain a synthetic product.

Figure 9:
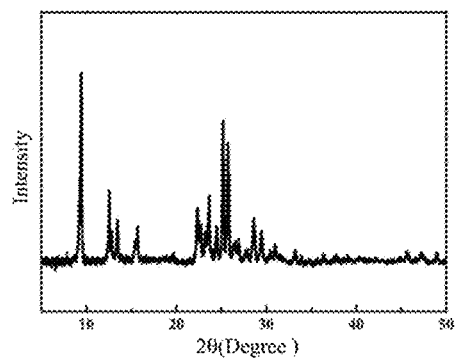
FIG. 9 is an XRD pattern of a ZSM-35 molecular sieve prepared by Example 5 of the present disclosure.

As determined by XRD, the phase of the synthetic product belongs to the ZSM-35 molecular sieve, and the relative crystallinity is 92%, as shown in FIG. 9.

Example 6

The preparation method of the quasi-solid-phase activated kaolin crystal seed is the same as that of Example 1.

0.78 g of sodium hydroxide is weighed, and dissolved with deionized water, stirring until a clear and transparent solution is obtained; 1.33 g of sodium aluminate (NaAlO$_2$, 80 wt %) is added, stirring until the solution is clear and transparent; afterwards, 19.5 g of a silica sol (SiO$_2$, 30 wt %) is added dropwise into the solution, stirring intensively for about 30 minutes to obtain a reactant precursor. The molar ratio of each component (in terms of its oxide) in the reactant gel is 2.5Na$_2$O:15SiO$_2$:Al$_2$O$_3$:500H$_2$O. Adding 5.0 wt % (the mass percentage is calculated based on the total mass of SiO$_2$ in the reactant gel) quasi-solid-phase activated kaolin to the reactant gel as the crystal seed, and continuously stirring for about 30 minutes, then a reactant precursor obtained is transferred into a 100 mL reactor lined with PTFE, and is placed in an oven at 175° C. for 48 h for static crystallization. After crystallization, the obtained synthesized product is filtered and washed with deionized water until the pH of the filtrate becomes neutral, and then dried at 120° C. for 6 h to obtain a synthetic product.

Figure 10:
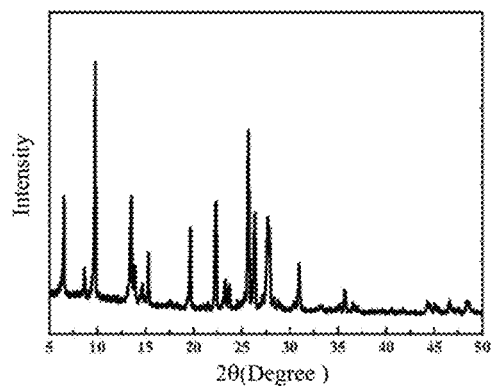
FIG. 10 is an XRD pattern of a mordenite molecular sieve prepared by Example 6 of the present disclosure.

As determined by XRD, the phase of the synthetic product belongs to the mordenite molecular sieve, and the relative crystallinity is 98%, as shown in FIG. 10. It has been determined that the nucleation induction period is less than 16 h.

Example 7

The preparation method of the quasi-solid-phase activated kaolin crystal seed is the same as that of Example 1.

1.12 g of sodium hydroxide is weighed, and dissolved with deionized water, stirring until a clear and transparent solution is obtained; 0.72 g of sodium aluminate (NaAlO$_2$, 80 wt %) is added, stirring until the solution is clear and transparent; afterwards, 21 g of a silica sol (SiO$_2$, 30 wt %) is added dropwise into the solution, stirring intensively for about 30 minutes to obtain a reactant gel. The molar ratio of each component (in terms of its oxide) in the reactant gel is 5.0Na$_2$O:30SiO$_2$:1Al$_2$O$_3$:1000H$_2$O. Adding 10.0 wt % (the mass percentage is calculated based on the total mass of SiO$_2$ in the reactant gel) quasi-solid-phase activated kaolin to the reactant gel as the crystal seed, and continuously stirring for about 30 minutes, then a reactant precursor obtained is transferred into a 100 mL reactor lined with PTFE, and is placed in an oven at 175° C. for 48 h for static crystallization. After crystallization, the obtained synthesized product is filtered and washed with deionized water until the pH of the filtrate becomes neutral, and then dried at 120° C. for 6 h to obtain a synthetic product.

Figure 11:
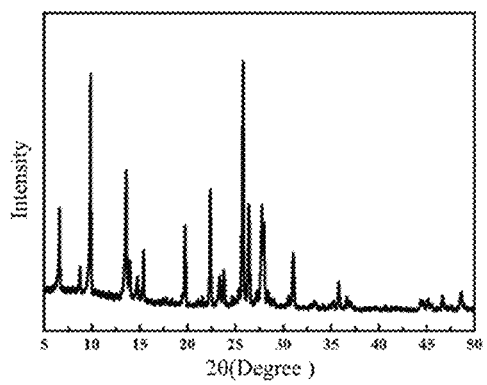
FIG. 11 is an XRD pattern of a mordenite molecular sieve prepared by Example 7 of the present disclosure.

As determined by XRD, the phase of the synthetic product belongs to the mordenite molecular sieve, and the relative crystallinity is 100.6%, as shown in FIG. 11.

Example 8

The preparation method of the quasi-solid-phase activated kaolin crystal seed is the same as that of Example 1.

2.55 g of quasi-solid-phase activated kaolin crystal seed is weighed and used as the aluminum source, 63 g of deionized water is added, stirring for 15 min to obtain a suspension, and then 17.95 g of a silica sol (SiO$_2$, 30 wt %) is added dropwise into the above suspension, then is placed in a 60° C. water bath and continuously stirred for 4 h, so as to obtain a reactant gel. The molar ratio of each component (in terms of its oxide) in the reactant gel is 3.45Na$_2$O: 20SiO$_2$:1Al$_2$O$_3$: 700H$_2$O. The obtained reactant gel is transferred into a 100 mL reactor lined with PTFE, and is placed in an oven at 175° C. for 48 h for static crystallization. After crystallization, the obtained synthesized product is filtered and washed with deionized water until the pH of the filtrate becomes neutral, and then dried at 120° C. for 6 h to obtain a synthetic product.

Figure 12:
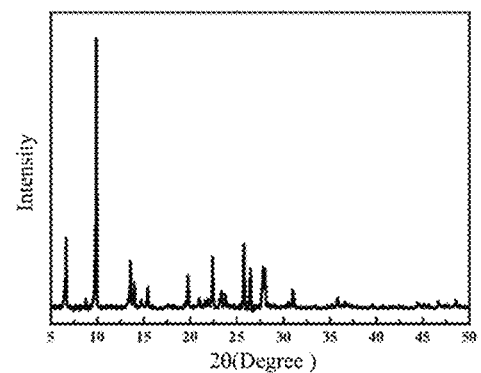
FIG. 12 is an XRD pattern of a mordenite molecular sieve prepared by Example 8 of the present disclosure.

As determined by XRD, the phase of the synthetic product belongs to the mordenite molecular sieve, and the relative crystallinity is 120%, as shown in FIG. 12.

Comparative Example 1

The steps for synthesizing crystal seed of the ZSM-35 molecular sieve are as follows: 0.74 g of sodium hydroxide and 0.82 g of sodium aluminate (NaAlO$_2$, 80 wt %) are weighed, and dissolved with deionized water, and stirring until a clear and transparent solution is obtained; and then adding 24.0 g of a silica sol (SiO$_2$, 30 wt %) dropwise into the solution; after the dropwise addition, stirring for 2 h, and then adding 3.42 g of pyrrolidine dropwise thereinto, aging at room temperature for 2 h. The molar ratio of each component in the reactant gel is 3.3Na$_2$O:30SiO$_2$:1Al$_2$O$_3$: 12Pyrrolidine:900H$_2$O. The obtained reactant precursor is transferred into a 100 mL reactor lined with PTFE, and is placed in an oven at 175° C. for 72 h for dynamic crystallization. After crystallization, the obtained synthesized product is filtered and washed with deionized water until the pH of the filtrate becomes neutral, and then dried at 120° C. for 6 h, and finally calcinated at 550° C. to remove the template agent, so as to obtain the crystal seed of the ZSM-35 molecular sieve.

1.42 g of potassium hydroxide is weighed, and dissolved with deionized water, stirring until a clear and transparent solution is obtained; 1.23 g of sodium aluminate (NaAlO$_2$, 80 wt %) is added, stirring until the solution is clear and transparent; afterwards, 24.0 g of a silica sol (SiO$_2$, 30 wt %) is added dropwise into the solution, stirring intensively for about 30 minutes to obtain a reactant gel. The molar ratio of each component (in terms of its oxide) in the reactant gel is 1.5Na$_2$O:2.0K$_2$O:20SiO$_2$:1Al$_2$O$_3$:600H$_2$O. Adding 5.0 wt % (the mass percentage is calculated based on the total mass of SiO$_2$ in the reactant gel) ZSM-35 molecular sieve to the reactant gel as the crystal seed, and continuously stirring for about 30 minutes, then a reactant precursor obtained is transferred into a 100 mL reactor lined with PTFE, and is placed in an oven at 175° C. for 48 h for dynamic crystallization, where the speed of rotation is controlled to be 30-60 rpm during the crystallization process. After crystallization, the obtained synthesized product is filtered and washed with deionized water until the pH of the filtrate becomes neutral, and then dried at 120° C. for 6 h to obtain a synthetic product.

Figure 13:
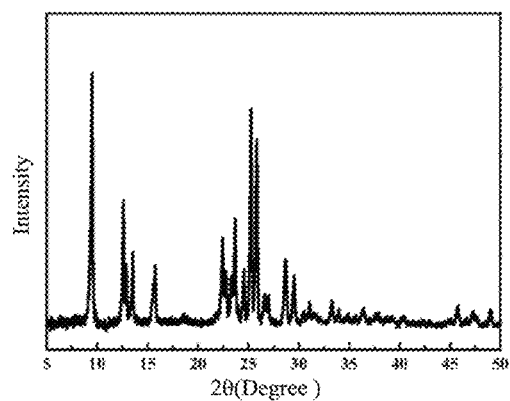
FIG. 13 is an XRD pattern of a ZSM-35 molecular sieve prepared by Comparative Example 1 of the present disclosure.

As determined by XRD, the phase of the synthetic product belongs to the ZSM-35 molecular sieve, and the relative crystallinity is 100%, as shown in FIG. 13.

Figure 14:
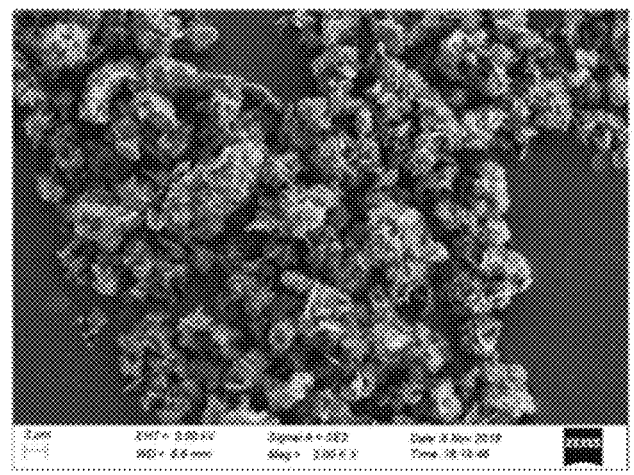
FIG. 14 is a SEM image, at a magnification of 2000 times, of a ZSM-35 molecular sieve prepared by Comparative Example 1 of the present disclosure.

As determined by SEM, the morphology of the product is typically lamellar, a few of lamellae are stacked in agglomeration, as shown in FIG. 14.

Figure 15:
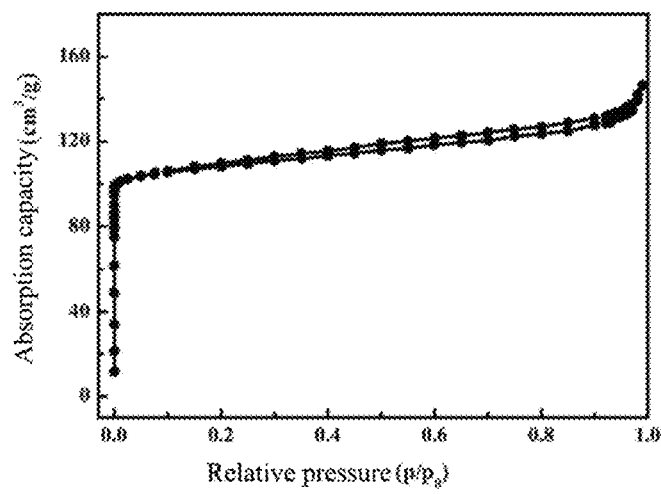
FIG. 15 is a $N_2$ adsorption-desorption isotherm of a ZSM-35 molecular sieve prepared by Comparative Example 1 of the present disclosure.

As determined by a gas adsorption instrument, the N$_2$ adsorption-desorption isothermal curve is of type I, and there is a long and narrow H4 hysteresis loop, indicating that it contains narrow cracking pores produced by cross-stacking of lamellar monocrystals, as shown in FIG. 15.

Figure 16:
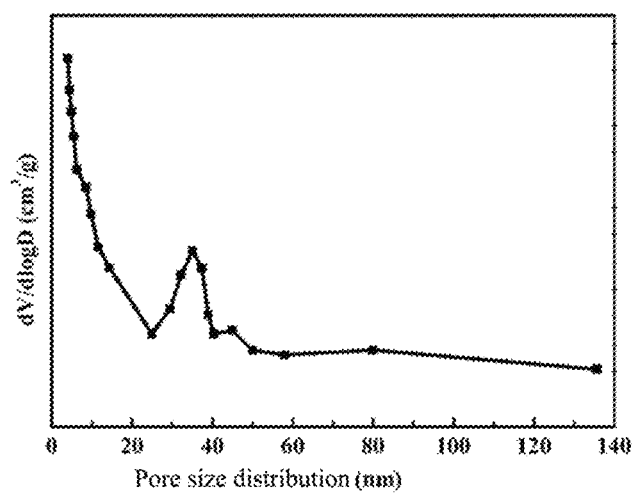
FIG. 16 is a BJH pore size distribution diagram (the ordinate is the pore volume expressed in logarithmic coordinate) of a ZSM-35 molecular sieve prepared by Comparative Example 1 of the present disclosure.

The measured BET specific surface area of the molecular sieve is 325 m$^2$/g, the area of the micropore is 309 m$^2$/g, the area of the mesoporous is 16 m$^2$/g, the pore volume of the micropore is 0.13 cm$^3$/g, the pore volume of the mesoporous is 0.03 cm$^3$/g. It can be seen from the pore size distribution diagram that the product has a certain amount of mesopores in the range of 20-50 nm, as shown in FIG. 16.

Figure 17:
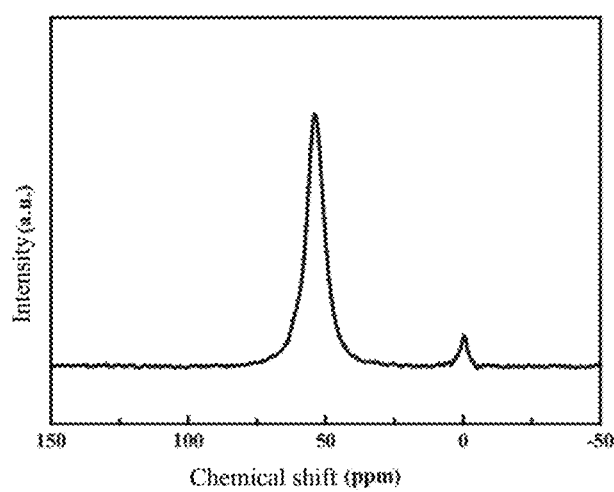
FIG. 17 is an $^{27}Al$ MAS NMR spectrum of a ZSM-35 molecular sieve prepared by Comparative Example 1 of the present disclosure.

As determined by $^{27}$Al MAS NMR, the synthesized product has a nuclear magnetic peak at δ=54 ppm, which belongs to tetra-coordinated framework aluminum of the molecular sieve, and a faint nuclear magnetic peak at δ=0 ppm, which belongs to non-framework aluminum, indicating that the atomic utilization rate of the system and the skeleton integrity of the product are both high, as shown in FIG. 17. It has been determined that the nucleation induction period is less than 9 h, and the rapid growth period is 9-20 h.

Comparative Example 2

1.42 g of potassium hydroxide is weighed, and dissolved with deionized water, stirring until a clear and transparent solution is obtained; 1.23 g of sodium aluminate (NaAlO$_2$, 80 wt %) is added, stirring until the solution is clear and transparent; afterwards, 24.0 g of a silica sol (SiO$_2$, 30 wt %) is added dropwise into the solution, stirring intensively for 30 minutes to obtain a reactant gel. The molar ratio of each component (in terms of its oxide) in the reactant gel is 1.5Na$_2$O:2.0K$_2$O:20SiO$_2$:1Al$_2$O$_3$:600H$_2$O. The obtained reactant precursor is transferred into a 100 mL reactor lined with PTFE, and is placed in an oven at 175° C. for 48 h for dynamic crystallization. After crystallization, the obtained synthesized product is washed with deionized water until the pH of the filtrate becomes neutral, and then dried at 120° C. for 6 h to obtain a synthetic product.

Figure 18:
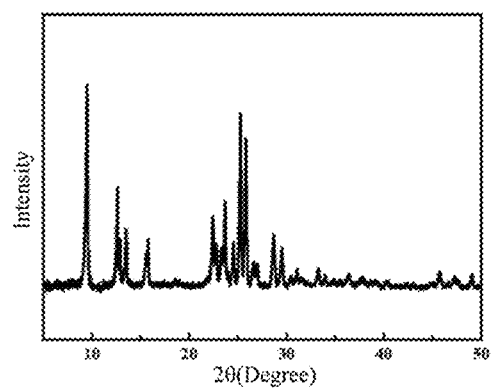
FIG. 18 is an XRD pattern of a ZSM-35 molecular sieve prepared by Comparative Example 2 of the present disclosure.

As determined by XRD, the phase of the synthetic product belongs to the ZSM-35 molecular sieve, and the relative crystallinity is 85%, as shown in FIG. 18.

Figure 19:
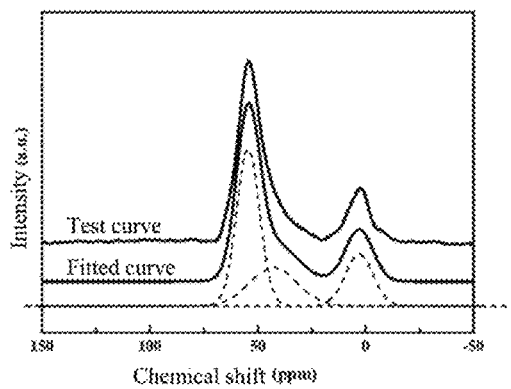
FIG. 19 is an $^{27}Al$ MAS NMR spectrum of a ZSM-35 molecular sieve prepared by Comparative Example 2 of the present disclosure.

As determined by $^{27}$Al MAS NMR, the synthesized product respectively has nuclear magnetic peaks at δ=54 ppm, 39 ppm and 0 ppm, which belong to tetra-coordinated framework aluminum structure, penta-coordinated framework aluminum and six-coordinated non-framework aluminum, respectively, indicating that there is no system of crystal seed, and the atomic utilization rate of the product and the skeleton integrity are both low, as shown in FIG. 19. It has been determined that the nucleation induction period is 16 h, and the rapid growth period is 16-56 h.

Comparative Example 3

1.42 g of potassium hydroxide is weighed, and dissolved with deionized water, stirring until a clear and transparent solution is obtained; 1.23 g of sodium aluminate (NaAlO$_2$, 80 wt %) is added, stirring until the solution is clear and transparent; afterwards, 24.0 g of a silica sol (SiO$_2$, 30 wt %) is added dropwise into the solution, stirring intensively for 30 minutes to obtain a reactant gel. The molar ratio of each component (in terms of its oxide) in the reactant gel is 1.5Na$_2$O:2.0K$_2$O:20SiO$_2$:1Al$_2$O$_3$:600H$_2$O. Adding 5.0 wt % (the mass percentage is calculated based on the total mass of SiO$_2$ in the reactant gel) unactivated kaolin to the reactant gel as the crystal seed, and continuously stirring for about 30 minutes, then a reactant precursor obtained is transferred into a 100 mL reactor lined with PTFE, and is placed in an oven at 175° C. for 48 h for dynamic crystallization. After crystallization, the obtained synthesized product is washed with deionized water until the pH of the filtrate becomes neutral, and then dried at 120° C. for 6 h to obtain a synthetic product.

Figure 20:
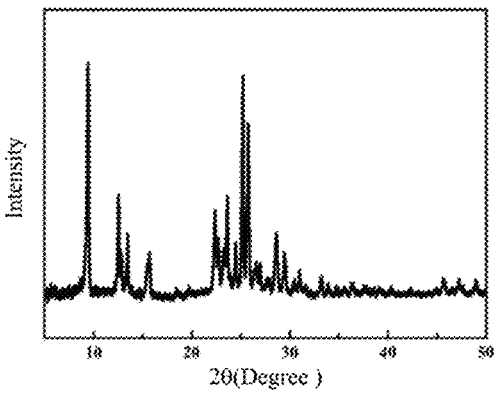
FIG. 20 is an XRD pattern of a ZSM-35 molecular sieve prepared by Comparative Example 3 of the present disclosure.

As determined by XRD, the phase of the synthetic product belongs to the ZSM-35 molecular sieve, and the relative crystallinity is 84%, as shown in FIG. 20. It indicates as follows: when the unactivated kaolin is used as the crystal seed, unreacted kaolin residual exists in the reaction product, reducing the crystallinity of the molecular sieve.

Comparative Example 4

The preparation method of the quasi-solid-phase activated kaolin crystal seed is the same as that of Example 1.

1.42 g of potassium hydroxide is weighed, and dissolved with deionized water, stirring until a clear and transparent solution is obtained; 1.23 g of sodium aluminate (NaAlO$_2$, 80 wt %) is added, stirring until the solution is clear and transparent; afterwards, 24.0 g of a silica sol (SiO$_2$, 30 wt %) is added dropwise into the solution, stirring intensively for about 30 minutes to obtain a reactant gel. The molar ratio of each component (in terms of its oxide) in the reactant gel is 1.5Na$_2$O:2.0K$_2$O:20SiO$_2$:1Al$_2$O$_3$:600H$_2$O. Adding 15.0 wt % (the mass percentage is calculated based on the total mass of SiO$_2$ in the reactant gel) quasi-solid-phase activated kaolin to the reactant gel as the crystal seed, and continuously stirring for about 30 minutes, then a reactant precursor obtained is transferred into a 100 mL reactor lined with PTFE, and is placed in an oven at 175° C. for 48 h for dynamic crystallization, where the speed of rotation is controlled to be 30-60 rpm during the crystallization process. After crystallization, the obtained synthesized product is washed with deionized water until the pH of the filtrate becomes neutral, and then dried at 120° C. for 6 h to obtain a synthetic product.

Figure 21:
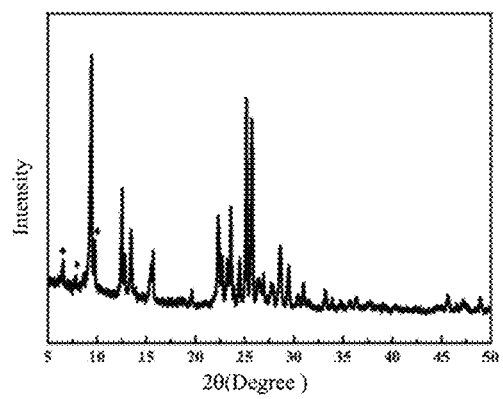
FIG. 21 is an XRD pattern of a mixed crystal product of a ZSM-35 molecular sieve and a mordenite molecular sieve prepared by Comparative Example 4 of the present disclosure.

As determined by XRD, the phase of the synthetic product belongs to the ZSM-35 molecular sieve and the mordenite molecular sieve, indicating that the additive amount of the crystal seed is too large to synthesize the pure phase ZSM-35 molecular sieve, as shown in FIG. 21.

Comparative Example 5

0.78 g of sodium hydroxide is weighed, and dissolved with deionized water, stirring until a clear and transparent solution is obtained; 1.33 g of sodium aluminate (NaAlO$_2$, 80 wt %) is added, stirring until the solution is clear and transparent; afterwards, 19.5 g of a silica sol (SiO$_2$, 30 wt %) is added dropwise into the solution, stirring intensively for about 30 minutes to obtain a reactant gel. The molar ratio of each component (in terms of its oxide) in the reactant gel is 2.5Na$_2$O:15SiO$_2$:1Al$_2$O$_3$:500H$_2$O. Adding 5.0 wt % (the mass percentage is calculated based on the total mass of SiO$_2$ in the reactant gel) mordenite molecular sieve (purchased from Nankai Catalyst Plant, molar ratio of SiO$_2$/Al$_2$O$_3$=50) to the reactant gel as the crystal seed, and continuously stirring for about 30 minutes, then a reactant precursor obtained is transferred into a 100 mL reactor lined with PTFE, and is placed in an oven at 175° C. for 48 h for static crystallization. After crystallization, the obtained synthesized product is washed with deionized water until the pH of the filtrate becomes neutral, and then dried at 120° C. for 6 h to obtain a synthetic product.

Figure 22:
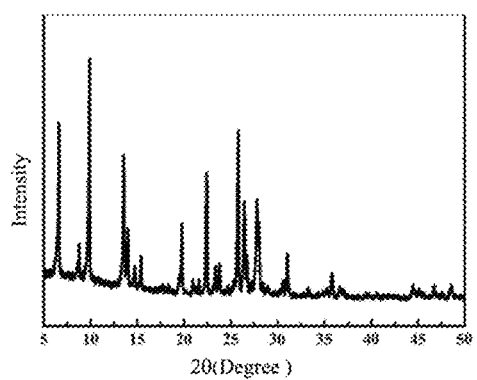
FIG. 22 is an XRD pattern of a mordenite molecular sieve prepared by Comparative Example 5 of the present disclosure.

As determined by XRD, the phase of the synthetic product belongs to the mordenite molecular sieve, and the relative crystallinity is 100%, as shown in FIG. 22. It has been determined that the nucleation induction period is less than 16 h.

Comparative Example 6

0.78 g of sodium hydroxide is weighed, and dissolved with deionized water, stirring until a clear and transparent solution is obtained; 1.33 g of sodium aluminate (NaAlO$_2$, 80 wt %) is added, stirring until the solution is clear and transparent; afterwards, 19.5 g of a silica sol (SiO$_2$, 30 wt %) is added dropwise into the solution, stirring intensively for about 30 minutes to obtain a reactant gel. The molar ratio of each component (in terms of its oxide) in the reactant gel is 2.5Na$_2$O:15SiO$_2$:1Al$_2$O$_3$:500H$_2$O. The obtained reactant gel is transferred into a 100 mL reactor lined with PTFE, and is placed in an oven at 175° C. for 48 h for static crystallization. After crystallization, the obtained synthesized product is washed with deionized water until the pH of the filtrate becomes neutral, and then dried at 120° C. for 6 h to obtain a synthetic product.

Figure 23:
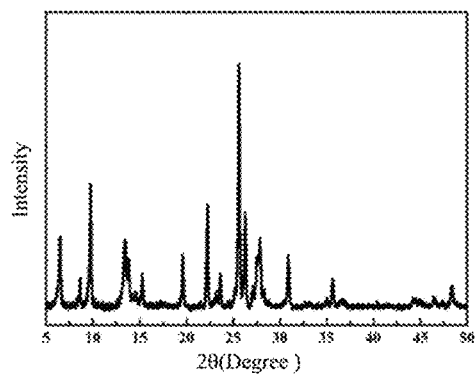
FIG. 23 is an XRD pattern of a mordenite molecular sieve prepared by Comparative Example 6 of the present disclosure.

As determined by XRD, the phase of the synthetic product belongs to the mordenite molecular sieve, and the relative crystallinity is 85%, as shown in FIG. 23. It has been determined that the nucleation induction period is less than 24 h. It indicates that the synthesized mordenite molecular sieve has a relatively low crystallinity and a relatively long nucleation induction period, without using a template agent and a crystal seed.

Finally, it should be noted that the above embodiments are merely used to illustrate the technical solutions of the present disclosure and shall not be construed as limitation; although the present disclosure has been described in detail with reference to the above embodiments, those skilled in the art will understand that they may still modify the technical solutions described in the above embodiments, or equivalently substitute some or all of the technical features therein; and the modifications or substitutions do not make the essence of the corresponding technical solutions deviate from the scope of the technical solutions of various embodiments of the present disclosure.

What is claimed is:

1. A method of synthesizing an aluminosilicate molecular sieve by a crystal seed-assisted method, comprising:
    performing activating treatment of a natural aluminosilicate clay mineral raw material with an alkali source, so as to prepare an activated crystal seed;
    mixing an alkali source aqueous solution with an aluminum source until a clear and transparent mixture is obtained, adding a silica sol dropwise into the mixture and stirring constantly, so as to prepare a reactant gel with an element composition controlled to be consistent with a composition of a target molecular sieve product;
    adding the activated crystal seed to the reactant gel and mixing to form a reactant precursor;
    putting the reactant precursor into a reactor for crystallization, wherein a crystallization temperature is 150-190° C., and a crystallization time is 36-72 h; and
    filtering a crystallization product, and washing to be neutral, then drying, so as to obtain the aluminosilicate molecular sieve;
    wherein the aluminosilicate molecular sieve is a ZSM-35 molecular sieve, a molar ratio of each component in the reactant gel is controlled as Na$_2$O:K$_2$O:SiO$_2$:Al$_2$O$_3$:H$_2$O=1.5:2.0-3.0:20-30:1:400-1200.

2. The method of synthesizing an aluminosilicate molecular sieve by a crystal seed-assisted method according to claim 1, wherein an additive amount of the activated crystal seed is 5.0-8.0% with respect to a total mass of a silicon source calculated in terms of silica in the reactant gel.

3. The method of synthesizing an aluminosilicate molecular sieve by a crystal seed-assisted method according to claim 1, wherein the natural aluminosilicate clay mineral raw material used for preparing the activated crystal seed is at least one selected from kaolin, rectorite, bentonite, illite, montmorillonite, mullite and diatomite.

4. The method of synthesizing an aluminosilicate molecular sieve by a crystal seed-assisted method according to claim 1, wherein the activating treatment comprises thermal activation, alkali fusion activation, sub-molten salt activation or quasi-solid-phase activation.

5. The method of synthesizing an aluminosilicate molecular sieve by a crystal seed-assisted method according to claim 1, wherein the crystallization comprises dynamic crystallization or static crystallization.

6. The method of synthesizing an aluminosilicate molecular sieve by a crystal seed-assisted method according to claim 1, wherein the alkali source used for preparing the activated crystal seed and the reactant gel is sodium hydroxide, potassium hydroxide or mixture thereof; the aluminum source comprises one or more selected from sodium aluminate, aluminum sulfate, aluminum nitrate, aluminum chloride and aluminum hydroxide.

* * * * *